US011006566B2

(12) United States Patent
Hause et al.

(10) Patent No.: US 11,006,566 B2
(45) Date of Patent: May 18, 2021

(54) SEED METERING DEVICE DRIVE SYSTEM AND METHOD

(71) Applicant: BW Elliott Mfg. Co., LLC, Binghamton, NY (US)

(72) Inventors: Kevin M. Hause, Binghamton, NY (US); Kevin G. Shaw, Binghamton, NY (US); James R. Case, Brackney, PA (US)

(73) Assignee: BW Elliott Mfg. Co., LLC, Binghamton, NY (US)

( * ) Notice: Subject to any disclaimer, the term of this patent is extended or adjusted under 35 U.S.C. 154(b) by 108 days.

(21) Appl. No.: 16/078,461

(22) PCT Filed: Feb. 6, 2017

(86) PCT No.: PCT/US2017/016701
§ 371 (c)(1),
(2) Date: Aug. 21, 2018

(87) PCT Pub. No.: WO2017/136823
PCT Pub. Date: Aug. 10, 2017

(65) Prior Publication Data
US 2019/0075715 A1 Mar. 14, 2019

Related U.S. Application Data

(60) Provisional application No. 62/302,557, filed on Mar. 2, 2016, provisional application No. 62/291,940, filed on Feb. 5, 2016.

(51) Int. Cl.
*A01C 7/04* (2006.01)
*A01C 19/02* (2006.01)
(Continued)

(52) U.S. Cl.
CPC .............. *A01C 7/046* (2013.01); *A01C 7/102* (2013.01); *A01C 19/02* (2013.01); *F16C 1/08* (2013.01);
(Continued)

(58) Field of Classification Search
CPC ......... A01C 7/046; A01C 7/044; A01C 7/042; A01C 7/04; A01C 7/00; A01C 7/102;
(Continued)

(56) References Cited

U.S. PATENT DOCUMENTS 4,779,471 A 10/1988 Rettig
5,170,909 A 12/1992 Lundie et al.
(Continued)

FOREIGN PATENT DOCUMENTS

CA    2288481 A1    9/2000
CN    201150183 Y   11/2008
(Continued)

OTHER PUBLICATIONS

Office Action issued from the European Patent Office for related Application No. 17708015.7 dated Nov. 6, 2019 (1 Page).
(Continued)

*Primary Examiner* — Christopher J. Novosad
(74) *Attorney, Agent, or Firm* — Michael Best & Friedrich LLP (57) ABSTRACT

A system for mechanically transmitting power from a common rotational drive shaft of a seeding implement to a geared outer periphery of a seed meter. The system includes a first transmission that connects to common rotational drive shaft, a flexible drive shaft coupled to the first transmission, and a second transmission coupled to the opposite end of the flexible drive shaft. A clutch assembly connects to a flexible drive shaft assembly to selectively allow power to be transmitted from the first transmission to the second trans- (Continued)

mission. The second transmission connects to the periphery of the seed meter. The seed plate of the seed meter includes a circumferential gear along a periphery to be driven by the second transmission.

20 Claims, 4 Drawing Sheets

(51) Int. Cl.
    *A01C 7/10*     (2006.01)
    *F16C 1/08*     (2006.01)
    *F16D 1/10*     (2006.01)
    *F16D 11/00*     (2006.01)

(52) U.S. Cl.
    CPC .............. *F16D 1/101* (2013.01); *F16D 11/00* (2013.01); *F16D 2001/102* (2013.01)

(58) Field of Classification Search
    CPC .. A01C 7/10; A01C 7/08; A01C 19/02; A01C 19/00; F16C 1/08; F16C 1/02; F16C 1/00; F16D 1/101; F16D 1/10; F16D 1/00; F16D 11/00; F16D 2001/102; F16D 2001/10
    See application file for complete search history.

(56) References Cited

U.S. PATENT DOCUMENTS

| | | |
|---|---|---|
| 7,571,688 B1 | 8/2009 | Friestad et al. |
| 7,726,251 B1 | 6/2010 | Peterson et al. |
| 2009/0000533 A1 | 1/2009 | Wendte |
| 2010/0294612 A1 | 11/2010 | Mariman et al. |
| 2015/0020625 A1 | 1/2015 | Hause et al. |

FOREIGN PATENT DOCUMENTS

| | | |
|---|---|---|
| CN | 202149198 U | 2/2012 |
| EP | 1619418 A2 | 1/2006 |
| WO | 2014/028990 A1 | 2/2014 |

OTHER PUBLICATIONS

International Search Report and Written Opinion for Application No. PCT/US2017/016701 dated Apr. 20, 2017 (11 pages).
Office Action issued from the Chinese Patent Office for related Application No. 201810224457.9 dated Jun. 23, 2020 (12 Pages including Statement of Relevance).
English Translation of Technical Opinion published from the Brazil Patent Office for related Application No. BR112018015934-4, notification dated Jun. 4, 2020 (2 pages).

SEED METERING DEVICE DRIVE SYSTEM AND METHOD

RELATED APPLICATIONS

This application claims priority to U.S. Provisional Application No. 62/291,940, filed on Feb. 5, 2016, and U.S. Provisional Application No. 62/302,557, filed Mar. 2, 2016, the entire contents of both of which are hereby incorporated by reference.

FIELD

This invention relates to power trains for seeders. More particularly, this relates to a system for selectively and precisely transmitting mechanical power from a common rotary drive shaft to the outer periphery of seed disk of a seeder.

BACKGROUND

Precision agriculture is creating greater yields with fewer resources. This increase in efficiency can come from a wide variety of improvements, such as data capture and analysis, GPS tracking and control, and greater control of seed placement, fertilizer application, and water usage.

Agricultural seeding implements, such as row crop planting implements and the like, typically include multiple seed metering devices that separate seeds from one another such that individual seeds can be dispensed at consistent intervals. Such seed metering devices can take various forms. For example, some seed metering devices use a vacuum to direct seeds, while others employ seed-selecting "fingers". Regardless of their specific construction, most conventional seed metering devices on a planting implement have typically been driven by a common drive shaft. Moreover, each seed metering device connects to a separate drive system that transmits power from the common drive shaft to the seed metering device. Historically, a chain a sprocket system has been used to drive each seed metering device, such as is shown in U.S. Pat. No. 5,170,909, which is hereby incorporated by reference in its entirety.

Some have increased precision by incorporating an electronic drive system (i.e., motor and gears) to independently drive each seed meter. Such a system is shown in U.S. Pat. No. 7,617,785, which is hereby incorporated by reference in its entirety. Unfortunately, this precision solution can be quite expensive to implement because each seed meter will require a separate electronic drive system. On a twelve row seeder, twelve separate electronic drive systems need to be purchased, maintained, and replaced, if needed.

The assignee of the present invention has development improved precision, mechanical drive systems that include a flexible shaft to transmit power between the common drive shaft and the seed metering device. In some cases, the drive system also includes a clutch that is disengageable to disconnect the drive shaft and the seed metering device. Such drive systems are described in co-pending U.S. Patent Application Publication Nos. US2014/0057728 and US2015/0020625, which are hereby incorporated by reference in their entirety. These flexible shafts significantly increase the level of precision for a seed meter compared to chain and sprocket systems. However, due to the torque requirements of center drive seed meters, like those shown in U.S. Pat. No. 5,170,909 and the like, these drive shafts have to be fairly large.

In view of the above, a low cost, high precision mechanical seed meter drive system that can operate under less torque would be desirable.

SUMMARY

In one independent aspect, a transmission for delivering mechanical power from a common rotational power source on an agricultural seeding machine to a circumferential geared surface of a seed plate within a seed meter mounted seeding machine is provided. The transmission may generally include a first gearbox coupled to and driven by the common rotational power source; a flexible shaft coupled to and driven by the first gearbox; and a second gearbox coupled to and driven by the flexible shaft. The second gearbox may include a gear that engages and drives the circumferential geared surface of the seed plate of the seed meter. In some embodiments, a clutch may be coupled to the flexible shaft to selective engage and disengage the second gearbox from the first gearbox. In some embodiments, each of the first gearbox, the clutch, the flexible shaft, and the second gearbox may be modular.

In another independent aspect, an agricultural seeding machine for planting a crop is provided. The seeding machine may generally include a plurality of seed meters that are mechanically driven about their circumference by a mechanical connection to a shaft on the seeding machine. The seeding machine may include a toolbar; a shaft coupled to the toolbar and rotating at a speed proportional to a speed of the seeding machine as it moves across a field; and a plurality of planting units coupled to the toolbar. Each planting unit may include a frame and a seed meter is mounted to the frame for metering seed to be planted. The seed meter may include a housing and a seed plate coupled to the housing for rotation about a central axis and having a geared circumferential surface adjacent the outer diameter of the seed plate. A drive system may be mechanically coupled to the shaft and the seed meter to selectively drive the seed meter. The drive system may include a first gearbox coupled to and driven by the common drive shaft and a second gearbox selectively coupled to the first gearbox via flexible shaft and a clutch coupled to the flexible shaft. The second gearbox may include a gear that engages and drives the geared circumferential surface of the seed plate of the seed meter.

In yet another independent aspect, a method of mechanically driving a seed plate of a seed meter in a rotational manner with mechanical power from a common rotational power source on an agricultural seeding machine is provided. The method may generally include mechanically driving a first gearbox with the common mechanical power source; mechanically driving a flexible shaft with the first gearbox; mechanically driving a second gearbox with the flexible shaft; and mechanically driving a geared circumferential surface of the seed plate with the second gear box.

Other aspects of the invention will become apparent by consideration of the detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Figure 1:
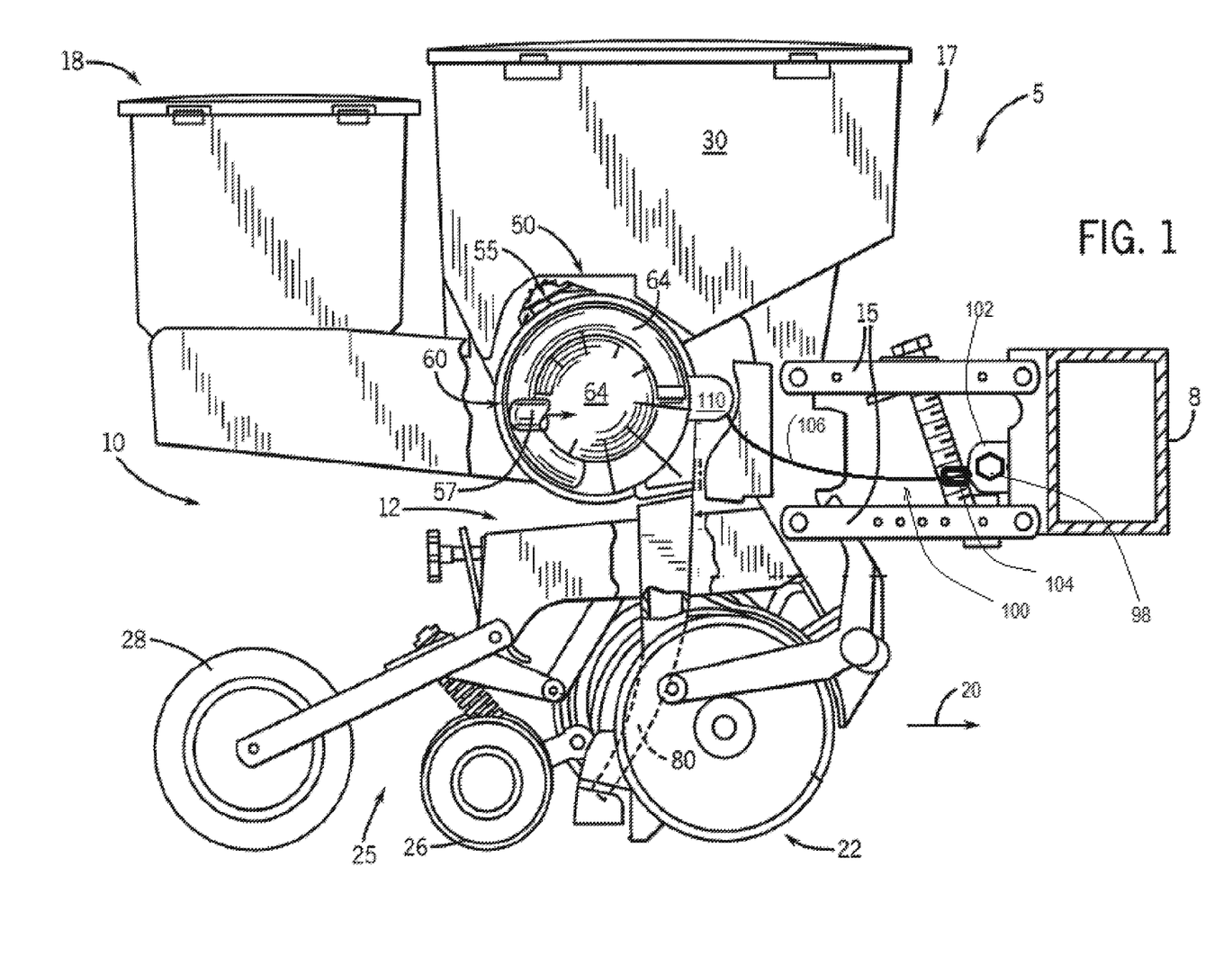
FIG. 1 is a side view of an exemplary seed planter incorporating an independent embodiment of the seed meter drive system of the present invention.

Referring now to the drawings and specifically to FIG. 1, a portion of a multiple row crop planter implement or seed planter 5 is shown. The seed planter 5 is typically pulled by a tractor or other traction device (not shown). Seed planter 5 includes a toolbar 8 that holds multiple individual row planting units 10, each row planting unit 10 being substantially identical. Only a single row planting unit 10 is shown for simplicity sake.

Row planting unit 10 includes a frame 12 that attaches the unit 10 to toolbar 8 by way of parallel linkages 15. Row planting unit 10 has a leading end 17 which faces the direction of travel, indicated by arrow 20. A trailing end 18 faces the opposite direction, away from the direction of travel 20. Frame 12 supports a furrow opening mechanism 22 near the leading end 17 of row planting unit 10, for cutting open the furrow to receive the deposited seeds.

A furrow closing mechanism 25 is located at the opposing end of the planting unit 10, near trailing end 18. Closing mechanism 25 includes a pair of furrow closer disks 26 and a trailing wheel 28. Correspondingly, after the closer disks 26 close the furrow, the trailing wheel 28 rolls over and tamps the furrow down.

Seed hopper 30 is mounted atop frame 12. Seed hopper 30 holds the seed supply for planting by the row planting unit 10. The particular seed hopper 30 shown in FIG. 1 is adapted and configured to store the seed material and gravitationally deposit the seed material to the ground as the seed planter 5 moves over and across the field. In other implementations, the seed supply is held in a primary seed hopper at a remote location, distant the various row planting units 10, whereby the seeds are supplied to the row planting units 10 pneumatically, or otherwise, through a seed conduit.

Figure 2:
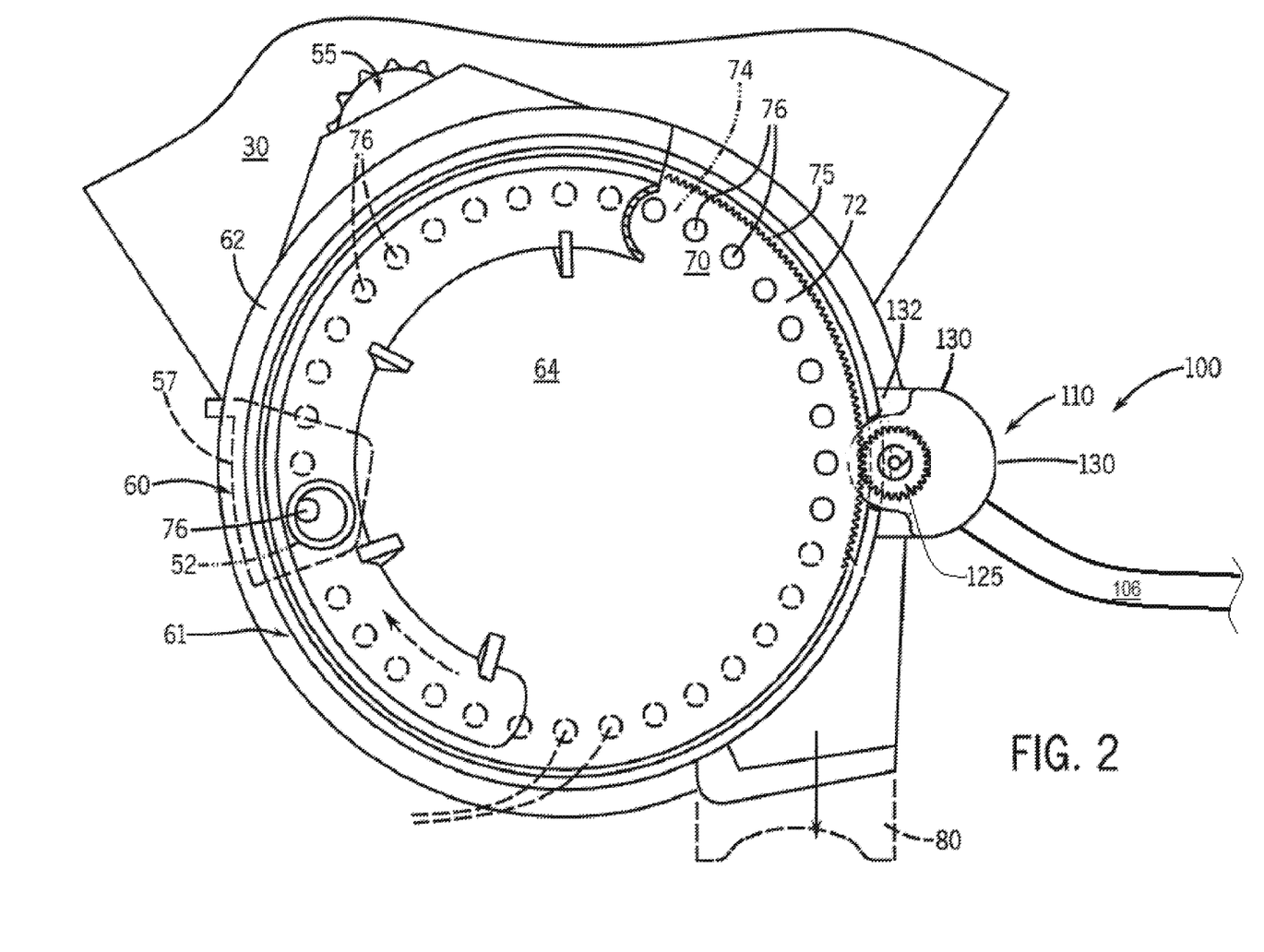
FIG. 2 is a side view of the seed meter transmission shown in FIG. 1 with the cover removed from the seed meter.

Regardless of the particular configuration of seed hopper 30, the seeds are directed from the seed hopper 30 to the seed metering system 50. As best seen in FIGS. 1-2, seed metering system 50 includes vacuum port 52, singulator assembly 55, seed inlet 57, meter housing 60, seed plate 70, and drive system 100. Vacuum port 52 extends from the meter housing 60 and is connected to a vacuum source (not shown). Singulator assembly 55 is attached to the meter housing 60 and is adapted and configured to inhibit more than one seed from being discharged from the seed metering system 50 per seed discharge event. Seed inlet 57 is an elongate enclosure or conduit extending and directing seeds between the seed hopper 30 and meter housing 60. In such configuration, the seeds move, e.g., by way of gravity from the seed hopper 30 through seed inlet 57 and into a reservoir or void space within the meter housing, such as meter cavity 61.

Meter housing 60 has a backing plate 62 and a cover 64, which are connected to each other and define a meter cavity 61 therebetween. The meter cavity 61 houses the seed plate 70 therein. As seen in FIG. 2, vacuum port 52 extends outwardly from cover 64 and seed inlet 57 extends from backing plate 62. In this configuration, it is apparent that the vacuum port 52 and seed inlet 57 are positioned on opposing sides of the meter housing 60 and seed plate 70. As desired, the vacuum port 52 and seed inlet 57 are at least partially registered with each other, on opposing sides of the seed plated 70. An opening 65 passes through the meter housing 60 permitting, e.g., portions or components of the drive system 100 to extend into the meter cavity 61 and cooperate and interface with the seed plate 70.

The seed plate 70 is a flat, disk-like member, having opposing front and back surfaces 72 and 74, respectively. Seed plate 70 has a geared outer circumferential surface 75, with, e.g., gear teeth radially extending therefrom. Seed pockets 76 are discrete openings that extend between front and back surfaces 72, 74, and thus through the entire thickness of the seed plate 70. The seed pockets 76 are spaced from each other, yet are radially spaced equidistant from an axis of rotation of the seed plate 70.

Seeds are guided, by the seed inlet 57, from seed hopper 30 to the meter cavity 61, generally into the space between the back surface 74 of seed plate 70 and the inwardly facing surface of backing plate 62. The seed plate 70 rotates in the meter cavity 61, whereby the seed pockets 76 pass across and interface the seeds which accumulate in the meter cavity 61. In vacuum-type implementations of the seed metering system 50, the vacuum or negative pressure is drawn through the vacuum port 52 and thus also through the seed pockets 76. In other words, vacuum or negative pressure is drawn from the beyond the front surface 72 which draws the seeds into the seed pockets 76, against the back surface 74 of seed plate 70. Regarding the particular vacuum-based methods and devices to apply negative pressure or vacuum to the seek pockets 76, any of the various conventional vacuum-based seed metering techniques will suffice, such as those disclosed in U.S. Pat. Nos. 5,170,909; 6,516,733; 6,776,108; and 7,699,009, which are herein incorporated by reference, in their entirety.

The vacuum holds the seeds in the seed pockets 76 where they are rotatably transported in unison with the rotation of seed plate 70. As the seeds rotate with seed plate 70, and thus as they approach the discharge portion of the seed metering system 50, the seeds encounter the singulator assembly 55. Singulator assembly 55 is a conventional seed singulator device which insures that one and only one seed is present in each seed pocket 76 as each particular seed pocket 76 approaches the discharge area of the seed metering system 50, for dispensation through a seed tube 80. The seeds that are delivered into the seed tube 80 are deposited into the furrow, between the furrow opening and closing mechanisms 22 and 25, respectively.

As explained in greater detail below, seed plate 70 rotates by way of its driven cooperation with drive system 100. As best illustrated in FIG. 1, the drive system 100 drives the seed meter 50 via a flexible shaft drive system that receives its power from a common rotational drive shaft 98 of the agricultural implement and ultimately transmits that power to the geared circumferential edge of the seed plate 70 radially displaced from the axis of rotation of the plate, requiring substantially less torque than conventional systems that drive the center shaft of the seed meter and thus allowing a smaller diameter flexible shaft than is conventionally used. Also, this particular configuration provides significant cost and maintenance advantages compared to systems individually driven by electric motors.

Figure 3:
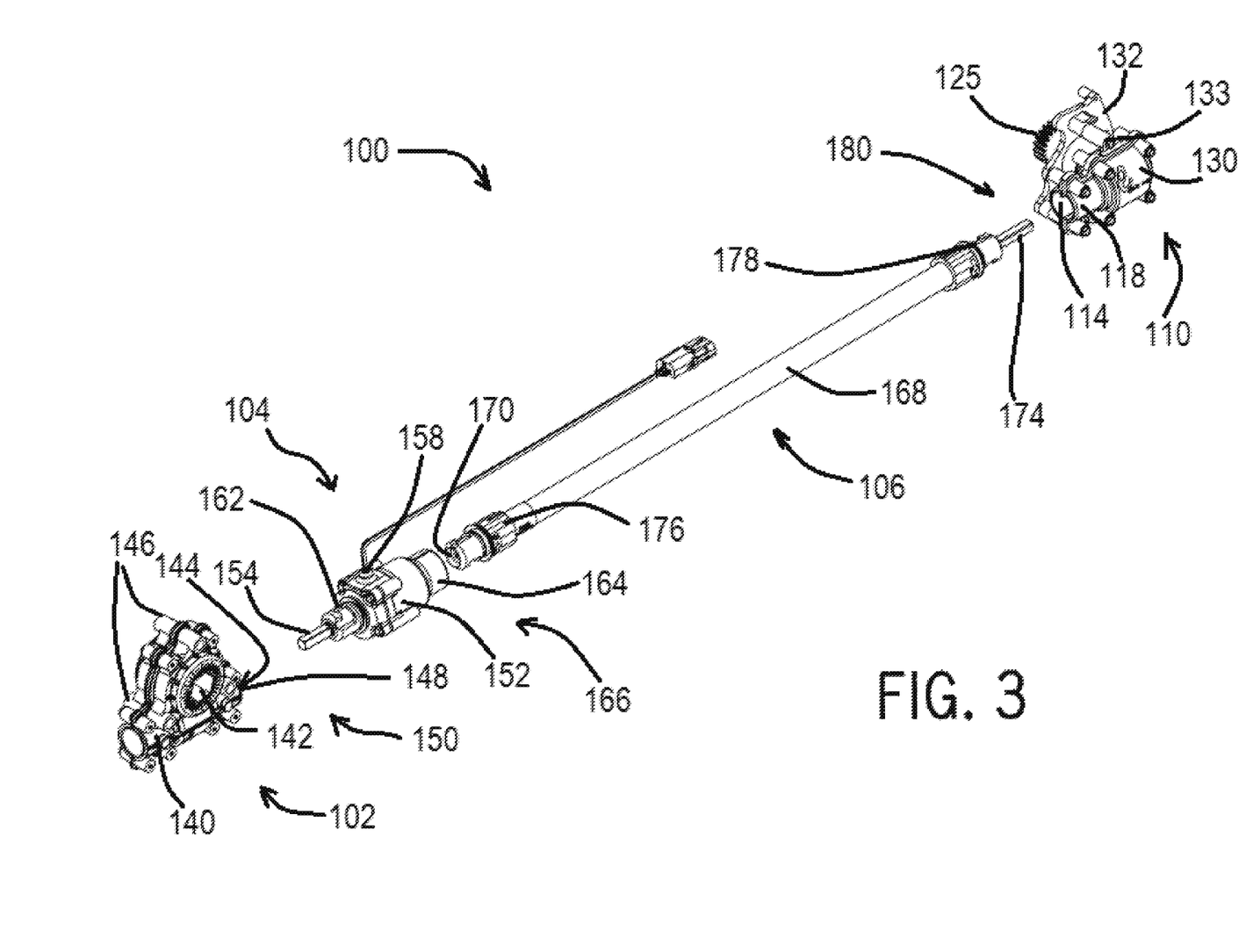
FIG. 3 is an exploded perspective view of a seed metering device drive system according to one independent aspect of the present invention.
Figure 4:
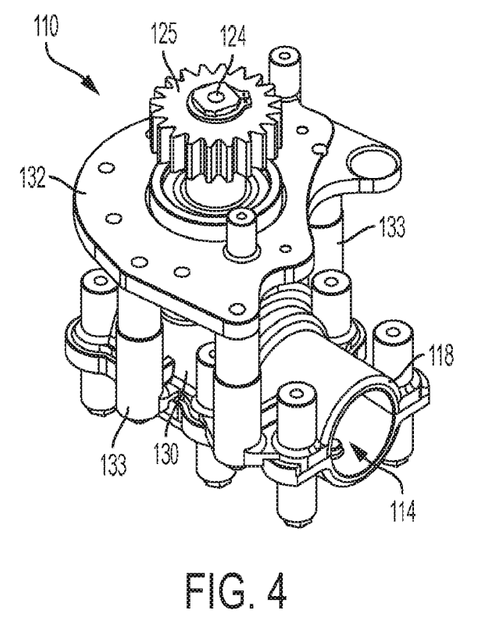
FIG. 4 is a perspective view one specific independent embodiment of a seed meter transmission or gearbox of the present invention.

Referring to FIG. 3, a seed metering device drive system 100 is shown and includes one or more components that are detachable and easily replaceable. In general, the seed metering device drive system 100 includes a drive shaft transmission or gearbox 102 that is driven by a common rotational drive shaft 98 of the agricultural implement (see FIG. 1). As shown, the drive shaft 98 is common shaft on the implement 5 providing power to each of the planting units 10. The drive shaft gearbox 102 drives a clutch assembly 104 that is operable to selectively transmit power from the gearbox 102 to a flexible shaft assembly 106. The flexible shaft assembly 106 drives a seed meter transmission or gearbox 110 that in turn drives the seed meter 50 via driving engagement of the gearbox 110 with the geared circumferential edge of seed plate 70. The following paragraphs further describe these components of the drive system 100 as well as features that facilitate easy detachability.

Referring specifically to FIG. 3, the drive shaft gearbox 102 includes a gearbox housing 140 that rotatably supports several internal components that transmit the rotary power of the common drive shaft 98. In particular, the gearbox housing 140 supports a drive shaft gearbox input coupling 142 that connects to and is rotated by the common drive shaft 98. In some embodiments and as shown in the figures, the input coupling 142 includes a hexagonal internal passageway that receives the common drive shaft 98. In some embodiments, the input coupling 142 may be a worm that engages and drives a worm gear (not shown) within the drive shaft gearbox 102. However, other means of transmitting rotational power and forces from drive shaft 98 are contemplated by the present invention. Other such means are described in co-owned U.S. Patent Application Publication No. US2014/0057728, which is hereby incorporated by reference in its entirety.

Regardless of its specific construction, the drive shaft gearbox input coupling 142 drives a rotatable drive shaft gearbox output coupling 144. In some embodiments (not shown in the figures), the output coupling 144 has an internal passageway with a square cross-sectional shape to engage a component of the clutch assembly 104 as described in further detail below. Alternatively, the internal passageway of the output coupling 144 may have a different cross-sectional shape provided that it is capable of engaging the clutch assembly 104.

Although the illustrated system shows the clutch assembly 104 being positioned at a first end of the flexible shaft assembly 106, in other embodiments (not shown), the clutch assembly 104 can be connected to the opposite end of the flexible shaft assembly 106. In particular, the clutch assembly 104 can be connected between the flexible shaft assembly 106 and the seed meter gearbox 110.

In addition to the components the gearbox housing 140 accommodates as described above, the housing 140 also includes a plurality of mounting features 146 (e.g., flanges having passageways for receiving fasteners) to secure the drive shaft gearbox 102 relative to the agricultural implement. The housing 140 also defines a first connecting member 148 of a first connection interface 150 proximate the output coupling 144. In some embodiments and as shown in the figures, the first connecting member 148 is an externally threaded surface. As described in further detail below, the first connecting member 148 connects to the clutch assembly 104.

The clutch assembly 104 includes a clutch housing 152 that supports several internal power-transmitting components. In particular, the clutch housing 152 supports a rotatable clutch input coupling 154 that connects to and is driven by the drive shaft gearbox output coupling 144. In some embodiments and as shown in the figures, the clutch input coupling 154 has a square cross-sectional shape that is received in the internal passageway of the drive shaft gearbox output coupling 144. Alternatively, the clutch input coupling 154 may have a different cross-sectional shape that it is capable of being received in the internal passageway of the drive shaft gearbox output coupling 144 and driven by the drive shaft gearbox output coupling 144. As another alternative, the drive shaft gearbox output coupling 144 may have a positive shape (e.g., a square cross-sectional shaped shaft) and the clutch input coupling 154 may have the inverse shape (e.g., a square cross-sectional passageway).

The clutch input coupling 154 also serves as the input to a clutch. The clutch may be of any appropriate type, such as an electrically-actuated wrap spring clutch or the like, provided that it can be connected to controls (e.g., via an input terminal 158) for selectively engaging and disengaging the device. As such, the clutch 104 may be engaged and disengaged to selectively drive the seed meter 50 with the common drive shaft 98 via drive system 100.

The clutch connects to and drives or integrally connects to and drives a rotatable clutch output (not shown). In some embodiments, the clutch output has an internal passageway with a square cross-sectional shape to engage a component of the flexible shaft assembly 106. This cross-sectional shape is preferably generally identical to that of the drive shaft gearbox output coupling 144.

In addition to the internal components described above, the clutch housing 152 also supports a second connecting member 162 of the first connection interface 150. In some embodiments and as shown in the figures, the second connecting member 162 has a bayonet style quick connect fitting. In particular, connecting member 162 includes a J-shaped bayonet connector slot adapted to receive a male pin inside the first connecting member 148. Other well-known connecting methods can also be used in other embodiments.

Regardless of their specific shapes, the second connecting member 162 matingly engages the first connecting member 148. That is, the first connecting member 148 and the second connecting member 162 have appropriate shapes and/or features to permit the drive shaft gearbox 102 and the clutch assembly 104 to be detachably secured to one another.

At the opposite end from the second connecting member 162, the housing 152 includes a first connecting member 164 of a second connection interface 166. In some embodiments and as shown in the figures, the first connecting member 164 is a male bayonet style quick connect fitting. In any case, the first connecting member 164 connects to the flexible shaft assembly 106 as described in further detail below.

The flexible shaft assembly 106 includes a flexible shaft housing 168 that rotatably supports several internal power-transmitting components. In particular, the flexible shaft housing 168 rotatably supports a flexible shaft input coupling 170 that connects to and is driven by the clutch output. In some embodiments and as shown in the figures, the flexible shaft input coupling 170 has a square cross-sectional shape that is received in the internal passageway of the clutch output. Alternatively, the flexible shaft input coupling 170 may have a different cross-sectional shape that it is capable of being received in the internal passageway of the clutch output and driven by the clutch output. As another alternative, the clutch output may have a positive shape (e.g., a square cross-sectional shaped shaft) and the flexible shaft input coupling 170 may have the inverse shape (e.g., a square cross-sectional passageway).

Although it is not illustrated, the flexible shaft input coupling 170 connects to a flexible core or shaft via, e.g., a crimped connection (also not shown). The flexible shaft may be of any appropriate type, such as the flexible shafts produced by Elliott Manufacturing of Binghamton, N.Y. In general, the flexible shaft is a semi-flexible component that transmits power between the drive shaft gearbox 102 and the seed meter gearbox 110. As used herein, the term "semi-flexible" and variations thereof mean that a component can support a torsional load, but buckles when subjected to axial compressive and side bending loads, and can stretch when subjected to an axial tension load. In addition, such components can significantly change shape without experiencing plastic deformation when first placed in a taut configuration and then subjected to compressive and/or bending loads. Stated another way, a longitudinal axis of the component can extend along one or more significant curves without subjecting the component to plastic deformation, and the component can be bent into a curved shape so as to exert a rotary driving torque about its axis from one end to the other while maintaining the curved shape. Stated yet another way, the semi-flexible structure permits the flexible shaft to rotate while connecting two couplings that are misaligned (i.e., the flexible shaft input coupling 170 and a flexible shaft output coupling 174 connected to the opposite side of the shaft).

As described briefly above, the flexible shaft connects to a rotatable flexible shaft output coupling 174 opposite the flexible shaft input coupling 170. In some embodiments and as shown in the figures, the flexible shaft output coupling 174 has a square cross-sectional shape that is generally identical to the shape of the flexible shaft input coupling 170. This construction, in addition to other features of the drive system 100, permits the flexible shaft assembly 106 to be connected to the clutch assembly 104 and the seed meter gearbox 110 in the opposite orientation. That is, the flexible shaft input coupling 170 could alternatively be connected and positioned to serve as the output coupling and vice versa.

In addition to the internal components described above, the shaft housing 168 also supports a second connecting member 176 of the second connection interface 166. In some embodiments and as shown in the figures, the second connecting member 176 has a bayonet style quick connect fitting. In particular, connecting member 176 includes a J-shaped bayonet connector slot adapted to receive a male pin inside the first connecting member 164. Other well-known connecting methods can also be used in other embodiments.

Regardless of their specific shapes, the second connecting member 176 matingly engages the first connecting member 164 of the second connection interface 166. That is, the first connecting member 164 and the second connecting member 176 have appropriate shapes and/or features to permit the clutch assembly 104 and the flexible shaft assembly 106 to be detachably secured to one another. Such mating features, in addition to the mating features of the first connection interface 150, permit the clutch assembly 104 to be easily removed and replaced in the case of component failure. Moreover, the first connection interface 150 and the second connection interface 166 preferably have generally identical mating features (e.g., bayonet style quick connect) to permit the flexible shaft assembly 106 to be connected directly to the drive shaft gearbox 102. In this case, the drive shaft gearbox output coupling 144 directly engages and drives the flexible shaft input coupling 170. Such a configuration may be useful if the clutch assembly 104 fails during use and a replacement assembly is not readily available.

At the opposite end, the flexible shaft housing 168 supports a first connecting member 178 of a third connection interface 180. In some embodiments and as shown in the figures, the first connecting member 178 has a bayonet style quick connect fitting. In particular, first connecting member 178 includes a J-shaped bayonet connector slot adapted to receive a male pin inside the connecting member 118. Other well-known connecting methods can also be used in other embodiments. Such a construction among components further permits the flexible shaft assembly 106 to be connected to the clutch assembly 104 and the seed meter gearbox 110 in the opposite orientation as described above.

Referring to FIGS. 3-6, the seed meter gearbox 110 includes a gearbox housing 130 that rotatably supports several internal components that transmit the rotary power received from the flexible shaft assembly 106 to the seeder 50. In particular, the gearbox housing 130 includes a rotatable seed meter gearbox input coupling 114. In some embodiments and as shown in the figures, the input coupling 114 has an internal passageway with a square cross-sectional shape to receive the flexible shaft output coupling 174. Alternatively, the input coupling 114 may have a passageway with a different shape that it is capable of drivingly receiving the flexible shaft output coupling 174. As another alternative, the input coupling 114 may have a positive shape (e.g., a square cross-sectional shaped shaft), and the flexible shaft output coupling 174 may have the inverse shape (e.g., a square cross-sectional passageway).

In some embodiments, the input coupling 114 may be a worm or may drive a worm that engages and drives a worm gear within the seed meter gearbox 110. However, in the illustrated embodiment (best shown in FIGS. 5 and 6), the input coupling 114 engages and drives a bevel gear assembly 120. The bevel gear assembly 120 includes a first gear 121 coupled to and driven by the input coupling 114 and a second gear 122 driven by the first gear 121. The second gear is coupled to output shaft 124 that in turn is coupled to and drives output gear 125. As illustrated, the first and second gears 121, 122 of the bevel gear assembly 120 are mounted on shafts 114, 124 that are ninety degrees apart. However, in other configurations, the gear assembly 120 and shafts 114, 124 can be positioned at other relative angles.

Figure 5:
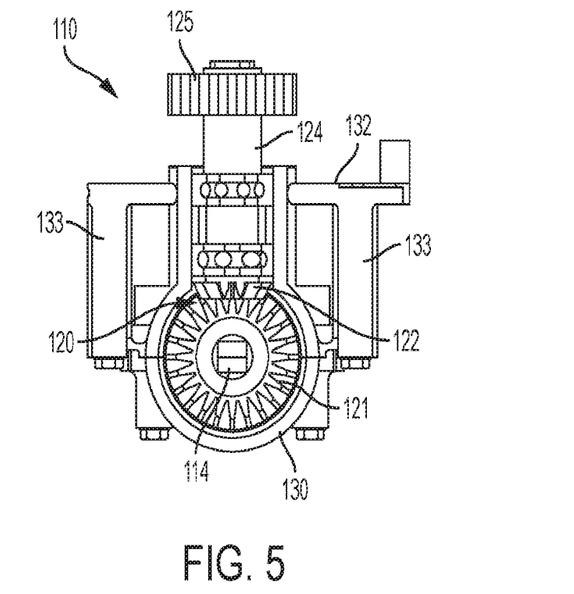
FIG. 5 is a first partial cross-sectional view of the seed meter gearbox shown in FIG. 4.
Figure 6:
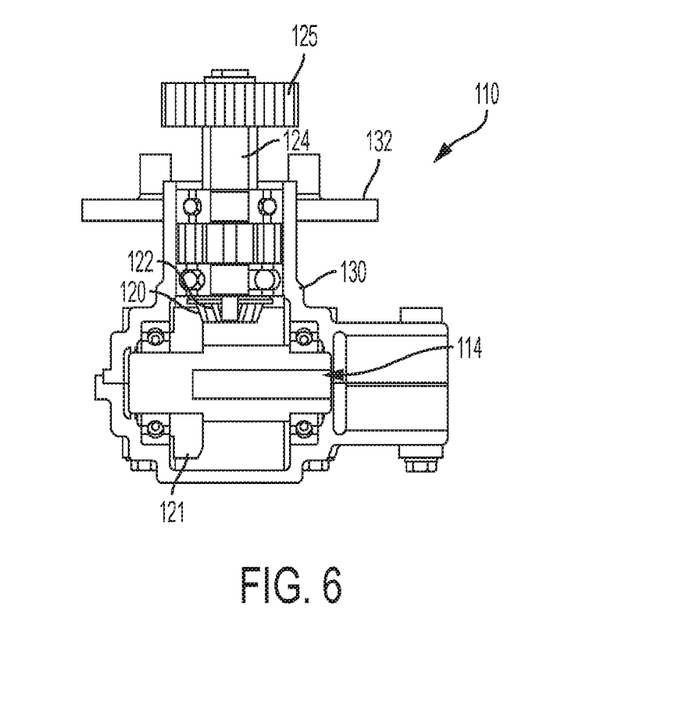
FIG. 6 is a second partial cross-sectional view of the seed meter gearbox shown in FIG. 4.

As shown in the illustrated embodiment, the input coupling 114 and output shaft 124 are positioned within the gearbox housing 130 for rotation via bearings. A first set of bearings position the input coupling 114 and first gear 121 for rotation about a first axis. A second set of bearings position the second bevel gear 122, output shaft 124, and output gear 125 for rotation about a second axis that is perpendicular to the first axis.

The housing 130 also defines a second connecting member 118 of the third connection interface 180 proximate the input coupling 114. In some embodiments (not shown in the figures), the second connecting member 118 bayonet style quick connect feature adapted for mating engagement with the first connecting member 178. In any case, the second connecting member 118 matingly engages the first connecting member 178 of the third connection interface 180.

In addition to the components the gearbox housing 130 accommodates as described above, the housing 130 also includes a plurality of mounting features 133 (e.g., flanges having passageways for receiving fasteners) to secure the seed meter gearbox 110 to the seed meter 50. In the complete assemblage, the output gear 125 can extend into meter housing 60 whereby the gear teeth of the seed plate 70, geared outer circumferential surface 75, and those of the output gear 125 can mesh and cooperatively interface. In other words, the output gear 125 and the geared outer circumferential surface 75 of seed plate 70 are configured in a cooperating, force transmitting, preferably gear teeth meshing manner. Accordingly, outer circumferential surface 75 and the outer circumferential surface of output gear 125 can have cooperating, e.g., spur gear teeth, helical gear teeth, or suitable force transmitting configurations.

In light of the above, during use, the desired seed type is received from the seed hopper 30, through the inlet 57, into the seed metering system 50. Simultaneously, furrow opening mechanism 22 opens a trough or furrow to receive seeds. Drive system 100 transmits rotational power of implement drive 98 to the seeder 50 via engagement of the teeth of output gear 125 meshing with and driving the corresponding teeth on the geared outer circumferential surface 75 of the seed plate 70.

Vacuum is applied from the front surface 72 of the seed plate 70, drawn through the seed pockets 76, thereby drawing seeds from the meter cavity 61 into the seed pockets 76. The seed plate continues to rotate which draws the seeds in the seed pockets 76 radially away from the mass of accumulated sees in the meter cavity 61. All but one seed per seed pocket 76 are removed by the singulator assembly 55, and each such single seed is ultimately discharged from the system 50 through the seed tube 80 into the furrow. As the seed planter 5 advances further, the furrow closing mechanism 25 closes the furrow with the seeds therein and the trailing wheel 28 tamps down the closed furrow.

From the above description, it should be apparent that the present invention may provide a seed meter drive system having one or more easily removable and/or replaceable components. In the independent embodiment shown in the figures, both the clutch assembly and the flexible shaft assembly are easily detachable and replaceable. Similarly and in some independent embodiments, the orientation of the flexible shaft may be reversed relative to the drive shaft gearbox and the seed meter gearbox. Moreover, in some cases, the shapes and/or features of connection interfaces between components may permit the flexible shaft assembly to be directly connected to the drive shaft gearbox if the clutch assembly is removed.

One or more independent features and/or independent advantages of the invention may be set forth in the following claims:

What is claimed is:

1. A transmission for delivering mechanical power from a common rotational power source on an agricultural seeding machine to a circumferential geared surface of a seed plate within a seed meter mounted on the seeding machine, the transmission comprising:
    a first gearbox coupled to and driven by the common rotational power source;
    a flexible shaft coupled to and driven by the first gearbox; and
    a second gearbox coupled to and driven by the flexible shaft, the second gearbox including an output gear that engages and drives the circumferential geared surface of the seed plate of the seed meter.

2. The transmission of claim 1, wherein the second gearbox includes
    a gearbox housing,
    an input coupling connectable to an end of the flexible shaft and having an outer surface,
    a gear assembly including
        a first gear on the outer surface of the input coupling,
        a second gear driven by the first gear, and
        a shaft having opposite ends and rotatably supported by the gearbox housing, the second gear being connected to one end of the shaft, the output gear being connected to the other end of the shaft.

3. The transmission of claim 2, wherein the gear assembly includes a bevel gear assembly.

4. The transmission of claim 2, wherein the gearbox housing includes a gearbox bayonet connecting member.

5. The transmission of claim 4, further comprising a flexible shaft housing rotatably supporting the flexible shaft, the shaft housing including a shaft bayonet connecting member engageable with the gearbox connecting member to connect the shaft housing and the gearbox housing.

6. The transmission of claim 5, wherein the first gearbox includes a first gearbox housing including a first gearbox bayonet connecting member, the shaft bayonet connecting member being alternatively connectable to the first gearbox bayonet connecting member and to the gearbox bayonet connecting member of the second gearbox.

7. The transmission of claim 2, wherein the second gearbox further includes a first bearing supporting the shaft proximate the one end and a second bearing supporting an intermediate portion of the shaft.

8. The transmission of claim 1, further comprising a clutch between the first gearbox and the second gearbox and operable to selectively drivingly couple the first gearbox to the second gearbox.

9. The transmission of claim 8, wherein the first gearbox includes a gearbox output coupling, wherein the flexible shaft includes a shaft input coupling, wherein the clutch includes a clutch input coupling, and wherein the gearbox output coupling is alternatively connected to a selected one of each of the shaft input coupling and the clutch input coupling.

10. The transmission of claim 9, wherein the clutch includes a clutch output coupling, and wherein the shaft input coupling is alternatively connected to a selected one of each of the gearbox output coupling and the clutch output coupling.

11. The transmission of claim 8, wherein the second gearbox includes a gearbox input coupling, wherein the flexible shaft includes a shaft output coupling, wherein the clutch includes a clutch input coupling, and wherein the shaft output coupling is alternatively connected to a selected one of each of the gearbox input coupling and the clutch input coupling.

12. The transmission of claim 11, wherein the clutch includes a clutch output coupling, and wherein the gearbox input coupling is alternatively connected to a selected one of each of the shaft output coupling and the clutch output coupling.

13. A method of mechanically driving a seed plate of a seed meter in a rotational manner with mechanical power from a common rotational power source on an agricultural seeding machine, the method comprising:
    mechanically driving a first gearbox with the common rotational power source;
    mechanically driving a flexible shaft with the first gearbox;
    mechanically driving a second gearbox with the flexible shaft; and
    mechanically driving a geared circumferential surface of the seed plate with the second gearbox.

14. The method of claim 13, wherein mechanically driving a second gearbox includes mechanically driving an output gear of the second gearbox, and wherein mechanically driving a geared circumferential surface includes mechanically driving the geared circumferential surface with the output gear.

15. The method of claim 13, further comprising:
mechanically driving a clutch with the first gearbox; and
selectively mechanically driving through the clutch the second gearbox.

16. A transmission for delivering mechanical power from a common rotational power source on an agricultural seeding machine to a circumferential geared surface of a seed plate within a seed meter mounted seeding machine, the transmission comprising:
a gearbox coupled to and driven by a flexible shaft, the gearbox including
a gearbox housing,
an input coupling connectable to an end of the flexible shaft and having an outer surface,
a drive gear engageable with and operable to drive the circumferential geared surface of the seed plate of the seed meter,
a gear assembly including
a first gear on the outer surface of the input coupling,
a second gear driven by the first gear, and
a shaft having opposite ends and rotatably supported by the gearbox housing, the second gear being connected to one end of the shaft, the drive gear being connected to the other end of the shaft.

17. The transmission of claim 16, wherein the gearbox is a seed meter gearbox, and wherein the transmission further comprises:
an input gearbox coupled to and driven by the common rotational power source; and
the flexible shaft coupled to the seed meter gearbox and coupled to and driven by the input gearbox.

18. The transmission of claim 16, further comprising a clutch between the seed meter gearbox and the input gearbox and operable to selectively drivingly couple the input gearbox to the seed meter gearbox.

19. The transmission of claim 16, wherein the gear assembly includes a bevel gear assembly.

20. The transmission of claim 16, wherein the gearbox housing includes a gearbox bayonet connecting member.

* * * * *